T. PERRON.
HAY PRESS.
APPLICATION FILED MAY 16, 1914.

1,119,037.

Patented Dec. 1, 1914.
3 SHEETS—SHEET 1.

*Fig. 1*

THÉODE PERRON
Inventor

Witnesses:

By

Attorneys

T. PERRON.
HAY PRESS.
APPLICATION FILED MAY 16, 1914.
1,119,037.
Patented Dec. 1, 1914.
3 SHEETS—SHEET 2.
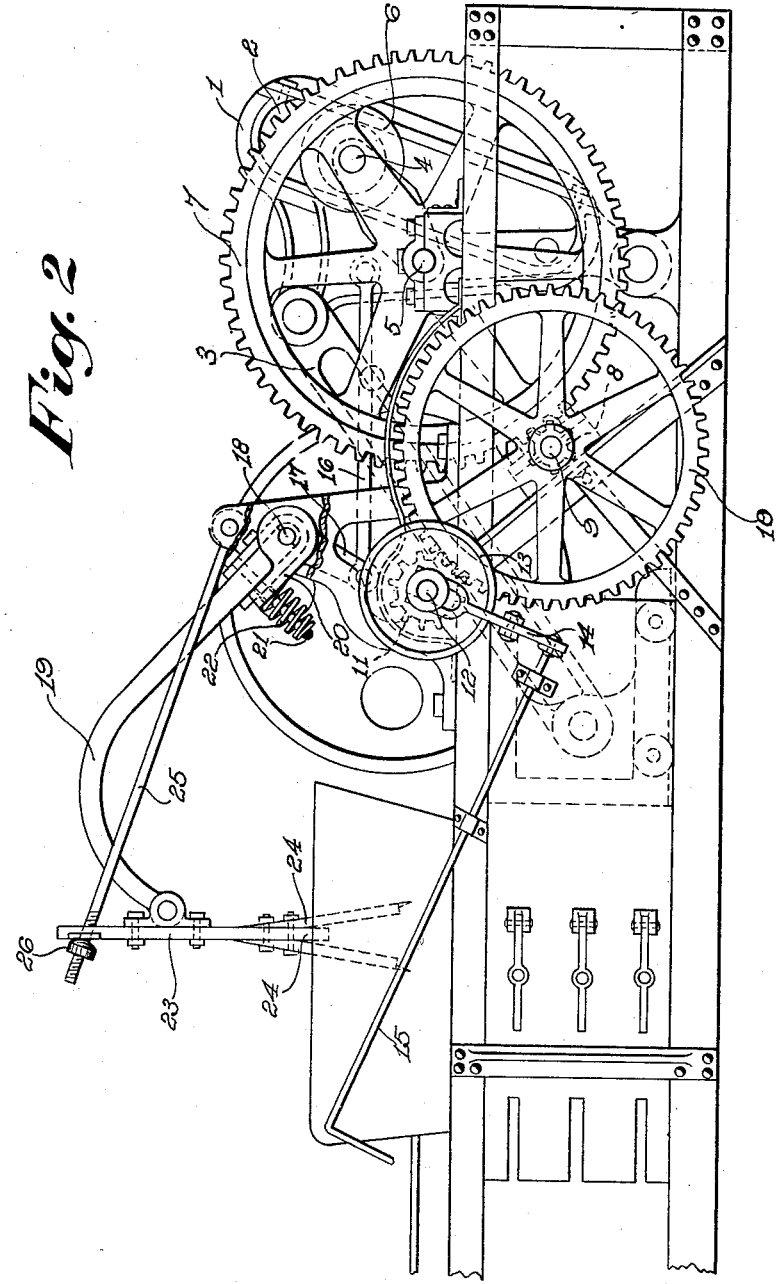
THÉODE PERRON
Inventor

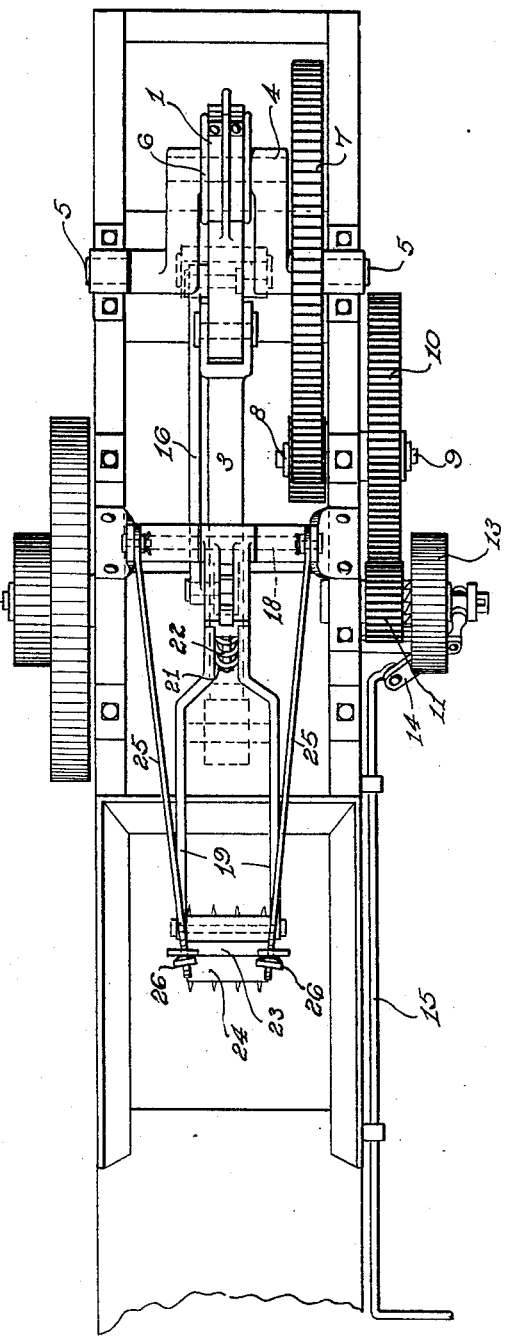

UNITED STATES PATENT OFFICE.

THÉODE PERRON, OF ST. CASIMIR, QUEBEC, CANADA.

HAY-PRESS.

1,119,037.          Specification of Letters Patent.        Patented Dec. 1, 1914.

Application filed May 16, 1914. Serial No. 839,143.

*To all whom it may concern:*

Be it known that I, THÉODE PERRON, a subject of the King of Great Britain, residing at St. Casimir, Portneuf county, Province of Quebec, Canada, have invented certain new and useful Improvements in Hay-Presses; and I do hereby declare that the following is a full, clear, and exact description of the invention, such as will enable others skilled in the art to which it appertains to make and use the same.

The invention to be hereinafter described relates to hay presses.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation; Fig. 2 is an opposite side elevation, partly broken away; and Fig. 3 is a top plan view.

The main objects of the invention are to provide a simple, efficient, economical, durable, and compact hay press in which the compression stroke of the plunger will be slow and powerful and the return stroke quick, together with automatic hay feeding means.

The frame, press box, and compression plunger, may be of any usual and well known construction. In the rear part of the lower frame members is pivotally mounted the lower end or angle of an operating triangular frame 1 having a long slot 2 extending along one side, and a plunger actuating pitman rod 3 pivotally connected to the opposite corner. The frame 1 is operated or rocked back and forth by means of a crank 4 on crank shaft 5 which is journaled in the frame, a suitable antifriction roller 6 being journaled on the crank to lessen or prevent friction between the crank and slot walls. Shaft 5 is driven by a gear 7 fixed thereto and in mesh with a pinion 8 fixed to a stub shaft 9 journaled in the frame and driven by a gear 10 in mesh with a pinion loose on a drive shaft 12 journaled in the frame and provided with a clutch member adapted to be engaged by a coöperating clutch member journaled on the hub of a small pulley 13 which is slidably keyed to the drive shaft 12 and moved into and out of engagement by a forked lever 14 fulcrumed on a bracket extending from the side of the frame. One end of the lever is pivotally connected to the crank of a rod 15 journaled in suitable bearings on the frame and provided with a crank handle. Thus, by rocking the rod 15, the pinion 11 may be clutched or unclutched, as desired.

Referring to Fig. 1, the rotation of gear 7 is in a clockwise direction. The result is that the leverage of the compression stroke is very gradual and powerful and increases in power and speed from the beginning to the completion of the stroke, while the return stroke is quickest at the beginning. The compression stroke occupies about two-thirds of a rotation of gear 7 and the return stroke the remainder. The length of both strokes is the same, of course. Therefore, the average speed of the return stroke is about twice that of the compression stroke. This is accomplished by pivoting frame 1 at a point immediately below the axis of gear 7, and just beyond the circumference, and by having the operative length of slot 2 just about equal to the inner diameter of gear 7, and having the operative surface of roller 6 distant from the axis of gear 7 equal to the inner radius of the gear 7. Pivotally connected to the frame 1 is a link 16, the opposite end of which is similarly connected to the arm 17 of a rock shaft 18 journaled in suitable brackets extending from the frame. To this shaft is keyed a plate 20 provided with a perforation. Freely revoluble on the shaft 18 is an elbow beam 19 which is yieldingly connected to the plate 20 by means of a bolt 21 which is passed through the plate and beam, a coil spring 22 being interposed between the plate and the nut at the end of the bolt.

To the free end of the elbow beam is pivoted a block 23 which carries a feeder head 24. In order to maintain perfectly true vertical movement of the feeding head during the feeding stroke, rods 25 are provided. These rods are pivotally connected at one end to the tops of the brackets in which shaft 18 is journaled, at points above the shaft, and their opposite ends are connected to the board 23 at points considerably above the pivotal connections of the head and elbow beam 19. These connections are made adjustable by means of screw threaded ends on the rods and thumb nuts 26, threaded thereon. Thus, the operative length of the rods is adjusted until the arc of swing of the outer ends of the rods exactly counteracts the arc of swing of the outer end of the beam 19, thus causing the block 23 and head 24 to travel in a vertical or upright position.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In a machine of the character described, a gear, an oscillating frame, connections between said gear and frame, a plunger, a pitman connecting said frame and plunger, an oscillating beam, a feeding head carried thereby, and connections between said oscillating beam and said oscillating frame.

In witness whereof I have hereunto set my hand in the presence of two witnesses.

THÉODE PERRON.

Witnesses:
A. BASTIEN,
A. PIZZOCOLO.

Copies of this patent may be obtained for five cents each, by addressing the "Commissioner of Patents, Washington, D. C."